United States Patent
Dittrich et al.

(10) Patent No.: US 8,150,888 B2
(45) Date of Patent: Apr. 3, 2012

(54) AUTOMATIC ELIMINATION OF FUNCTIONAL DEPENDENCIES BETWEEN COLUMNS

(75) Inventors: Jens-Peter Dittrich, Heidelberg (DE); Olaf Meincke, Heidelberg (DE); Guenter Radestock, Karlsruhe (DE); Andrew Ross, Altrip (DE)

(73) Assignee: SAP AG, Walldorf (DE)

( * ) Notice: Subject to any disclaimer, the term of this patent is extended or adjusted under 35 U.S.C. 154(b) by 638 days.

(21) Appl. No.: 12/098,350

(22) Filed: Apr. 4, 2008

(65) Prior Publication Data

US 2008/0250041 A1 Oct. 9, 2008

Related U.S. Application Data

(63) Continuation of application No. 10/789,371, filed on Feb. 26, 2004, now Pat. No. 7,373,354.

(51) Int. Cl.
*G06F 7/00* (2006.01)
(52) U.S. Cl. ........ 707/802; 707/803
(58) Field of Classification Search .......... 707/790, 707/802, 803, 808, 809, 812
See application file for complete search history.

(56) References Cited

U.S. PATENT DOCUMENTS

| | | | | |
|---|---|---|---|---|
| 5,761,653 | A | * | 6/1998 | Schiefer et al. ...... 707/713 |
| 5,918,225 | A | * | 6/1999 | White et al. ...... 1/1 |
| 6,496,819 | B1 | * | 12/2002 | Bello et al. ...... 1/1 |
| 2002/0077997 | A1 | * | 6/2002 | Colby et al. ...... 707/1 |
| 2004/0034616 | A1 | * | 2/2004 | Witkowski et al. ...... 707/1 |
| 2004/0044685 | A1 | * | 3/2004 | Huynh et al. ...... 707/104.1 |
| 2005/0004936 | A1 | * | 1/2005 | Potapov et al. ...... 707/103 R |

* cited by examiner

*Primary Examiner* — Angela Lie
(74) *Attorney, Agent, or Firm* — Mintz, Levin, Cohn, Ferris, Glovsky & Popeo, P.C.

(57) ABSTRACT

In business systems, one or more methods can be used to reduce an amount of redundant data. In one implementation, a method to reduce redundancy within a data model in a database, in which the data model is represented by at least one table, includes determining a number of distinct values of partial keys in a table. Each partial key represents at least one row in the table. The method includes reordering one or more columns of the table by cardinality of partial keys, in which the cardinality of a partial key represents a number of distinct values of the partial key. The method further includes determining whether pairs of partial keys are functionally dependent and eliminating one or more columns having functional dependencies from the table.

20 Claims, 4 Drawing Sheets

Table T

100

Figure 2:
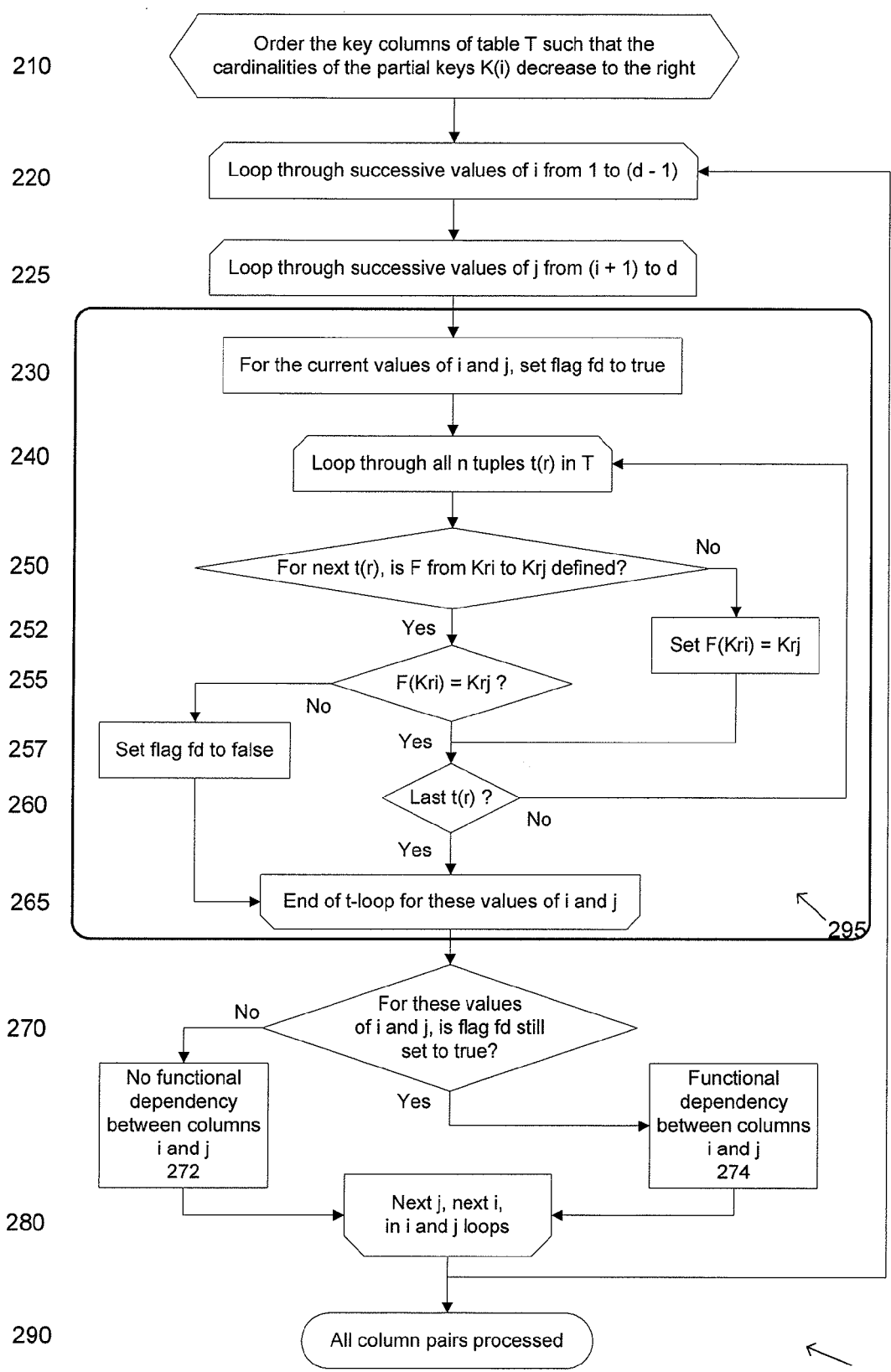

| 110 Partial key (key attribute) K(1) | ... | 120 Partial key (key attribute) K(i) | ... | 130 Partial key (key attribute) K(j) | ... | 140 Partial key (key attribute) K(d) | 150 Key figure (non-key attribute) N(1) | ... | 160 Key figure (non-key attribute) N(k) |
|---|---|---|---|---|---|---|---|---|---|
| 170 Row 1 K11 | ... | ... | ... | ... | ... | K1d | N11 | ... | N1k |
| ... | ... | ... | ... | ... | ... | ... | ... | ... | ... |
| 180 Row r Kr1 | ... | Kri | ... | Krj | ... | Krd | ... | ... | ... |
| ... | ... | ... | ... | ... | ... | ... | ... | ... | ... |
| 190 Row n Kn1 | ... | ... | ... | ... | ... | Knd | Nn1 | ... | Nnk |

Tuple t(r) = { Kr1, ..., Kri, ..., Krj, ..., Krd, Nr1, ..., Nrk }

FIG. 1

Table T

100

| 110 Partial key (key attribute) K(1) | ... | 120 Partial key (key attribute) K(i) | ... | 130 Partial key (key attribute) K(j) | ... | 140 Partial key (key attribute) K(d) | 150 Key figure (non-key attribute) N(1) | ... | 160 Key figure (non-key attribute) N(k) |
|---|---|---|---|---|---|---|---|---|---|
| 170 Row 1 K11 | ... | ... | ... | ... | ... | K1d | N11 | ... | N1k |
| ... | ... | ... | ... | ... | ... | ... | ... | ... | ... |
| 180 Row r Kr1 | ... | Kri | ... | Krj | ... | Krd | ... | ... | ... |
| ... | ... | ... | ... | ... | ... | ... | ... | ... | ... |
| 190 Row n Kn1 | ... | ... | ... | ... | ... | Knd | Nn1 | ... | Nnk |

Tuple t(r) = { Kr1, ..., Kri, ..., Krj, ..., Krd, Nr1, ..., Nrk }

AUTOMATIC ELIMINATION OF FUNCTIONAL DEPENDENCIES BETWEEN COLUMNS

CROSS REFERENCE TO RELATED APPLICATIONS

This application is a continuation application of U.S. patent application Ser. No. 10/789,371, filed on Feb. 26, 2004 now U.S. Pat. No. 7,373,354, entitled "AUTOMATIC ELIMINATION OF FUNCTIONAL DEPENDENCIES BETWEEN COLUMNS," the contents of which are hereby incorporated by reference.

BACKGROUND

The following description relates to reorganizing data in machine-readable mediums, data processing systems, and in memory to reduce the redundancy of the data and allow the available system resources to be used efficiently Companies handle and store large amounts of data. Such data can consume significant information technology resources, both during handling and processing, when it occupies space in memory (e.g., random access memory, RAM) and during long-term storage, when it occupies space on a machine-readable medium (e.g., hard disk or magnetic tape). For example, businesses may not only need to spend a portion of their resources on computers for workers, but for the data that the workers collect, process, and generate. Resources may also have to be spent for servers, databases, and systems to store the data, as well as warehouses and facilities to store those components. Businesses may have to allocate resources and personnel for the management of the data, and the ability to turn their data into useful organizational knowledge.

Certain techniques of organizing, formatting, or storing business data, when employed in certain business scenarios, can contribute to various amounts of data redundancy. For example, companies often store large volumes of business data in data models, such as cube-like data models, that are optimized for a large number of business scenarios. Even though the cube-like data models may offer advantages in a particular business scenario, the data models may be superfluous or irrelevant for other business scenarios. When businesses have data models for a significant amount of irrelevant scenarios, the stored data using such models may include redundancies and may occupy more space than necessary in memory. If the data can be reorganized in such a way that the amount of redundancy is reduced, then the business can reduce the costs of storing and managing the data.

SUMMARY

In one implementation, the present disclosure relates to a computer-implemented method of reducing redundancy within a data model in a database, in which the data model is represented by at least one table. The method includes determining a number of distinct values of partial keys in a table. Each partial key represents at least one row in the table. One or more columns of the table are reordered by cardinality of partial keys, in which the cardinality of a partial key represents a number of distinct values of the partial key. The method includes determining whether pairs of partial keys are functionally dependent, and eliminating one or more columns having functional dependencies from the table.

The method may include placing one or more eliminated columns into a separate table so that the column with a highest cardinality is in the leftmost position, and the column with the lowest cardinality is in the rightmost position. The partial key $K(i)$ can have a partial key with an index i and a value Kri for a tuple t(r) in row with index r. The number of distinct values of $K(i)$ can include cardinality $|K(i)|$. The tuple t may include k key figures and d partial keys $K(1), \ldots, K(d)$. A table T may have n tuples and d+k columns, in which the n tuples includes rows. A function $F(x)=y$ may include a mapping between partial keys x and y in a same tuple, and a flag fd may have the Boolean values of true or false.

In determining whether pairs of partial keys are functionally dependent, the method may include defining function F from each partial key to every other partial key to its right in a reordered table for each row in table T. The method may also include a determination that a functional dependency exists when the function $F(Kri)=Krj$ is the same function for each tuple t(r) in the table for values of index i from 1 to (d−1) and for values of j from (i+1) to d. When a tuple t is in the table T and $F(Kri)$ is not equal to Krj, a functional dependency may not exist between columns i and j.

In determining whether pairs of partial keys are functionally dependent for each i from 1 to (d−1) and j from (i+1) to d, the method may include setting the flag fd to true. For each tuple t in T, the method may include determining whether $F(Kri)$ is defined, in which $F(Kri)$ is set equal to Krj upon determining that $F(Kri)$ is not defined. The determining whether pairs of partial keys are functionally dependent, the method may also include looping through the tuples t in T, generating a report indicating that column i is functionally dependent on column j if flag fd is true after the looping through the tuples t in T.

In determining whether $F(Kri)$ is defined, the method may include that upon determining that $F(Kri)$ is defined, determining whether $F(Kri)$ is equal to Krj in which determining that $F(Kri)$ is equal to Krj can permit looping through the tuples t in T. In determining that $F(Kri)$ is not equal to Krj, the method may involve concluding that $K(i)$ is not functionally dependent on $K(j)$, setting flag fd to false, and breaking the looping through the tuples t in T.

In another implementation, the present disclosure relates to a computer-implemented method of reducing redundancy within a data model in a database, in which the data model is represented by at least one table. The method includes determining a number of distinct values of partial keys in a table, and reordering one or more columns of the table by cardinality of partial keys, in which each partial key represents at least one row in the table. The cardinality of a partial key represents a number of distinct values of the partial key. The method also includes determining whether pairs of partial keys are functionally dependent, eliminating one or more columns having functional dependencies from the table, and creating an exception list for the pairs of partial keys that are not functionally dependent.

The partial key $K(i)$ may include a partial key with an index i for a tuple t, in which the number of distinct values of $K(i)$ includes cardinality $|K(i)|$. The tuple t may include k key figures and d partial keys $K(i)$ for i from 1 to d, and a table T may include n tuples and (d+k) columns. The n tuples may include rows, and a function $F(x)=y$ may have a mapping between partial keys x and y in a same tuple. The exception list for the pairs of partial keys that are not functionally dependent can include partial keys pairs that do no fit a functional dependency defined for other tuples in the table. The exception list can represent errors in the one or more data models.

In determining whether pairs of partial keys are functionally dependent, the method may include defining function F from each partial key to every other partial key to its right in a reordered table for each row in table T, and determining a functional dependency exists for i from 1 to (d−1) and j from (i+1) to d. The function F(Kri)=may be the same function for each tuple t(r) in the table. When for i from 1 to (d−1) and j from (i+1) to d, the function F(Kri)=Krj is not the same function for each tuple t(r) in the table, and there may exist one or more mappings from Kri to Krj for different values of r. Different values of r can be related to different tuples t(r), and upon determining multiple mappings, the method may include checking whether one or more entries in set {Krj} are similar for each t(r).

A similarity can be defined with a similarity function and/or a data cleansing function. If a subset of {Krj} is similar, the subset may be compressed to a single value x to compress multiple mappings to a single functional dependency. If a subset of {Krj} is not similar, an exception list for non-similarities may be created. The creation of an exception list for non-similarities may involve mapping a row number r for tuple t(r) of each dissimilar entry Krj to a corresponding value Kri.

The method may also include rewriting one or more queries against the table to check the exception list before accessing function F. If no entry exists for the current row in that list, the functional dependency defined by F may be used.

In another implementation, an article comprising a machine-readable medium storing instructions operable to cause a machine to perform operations that include reducing redundancy within a data model in a database, in which the data model is represented by at least one table. The reduction of redundancy includes determining a number of distinct values of partial keys in a table, and reordering one or more columns of the table by cardinality of partial keys, in which each partial key represents at least one row in the table. The cardinality of a partial key represents a number of distinct values of the partial key. The reduction of redundancy also includes determining whether pairs of partial keys are functionally dependent, and eliminating one or more columns having functional dependencies from the table.

The systems and techniques described here may provide one or more of the following advantages. For example, one or more methods described can permit a business that stores large amounts of data to reduce an amount of memory required to store the data to realize performance benefits, such as increasing the speed of business processes or reducing network traffic. The methods may permit a business to store the data in less space on databases or other machine-readable media. The amount of resources (e.g., equipment, personnel, money, facilities) for storing and managing data may be reduced, as well as data-related costs. Redundancy reduction may be performed automatically (e.g., without human intervention) or semi-automatically (e.g., with limited human intervention). The systems and techniques may provide insight for one or more users of the data for improving the manner in which the data is organized in data models or in a data schema (e.g., the structure of a database system, usually with tables, fields in each table, and relationships between the fields and tables).

The details of one or more implementations are set forth in the accompanying drawings and the description below. Other features and advantages will be apparent from the description and drawings, and from the claims.

DRAWING DESCRIPTIONS

Figure 3:
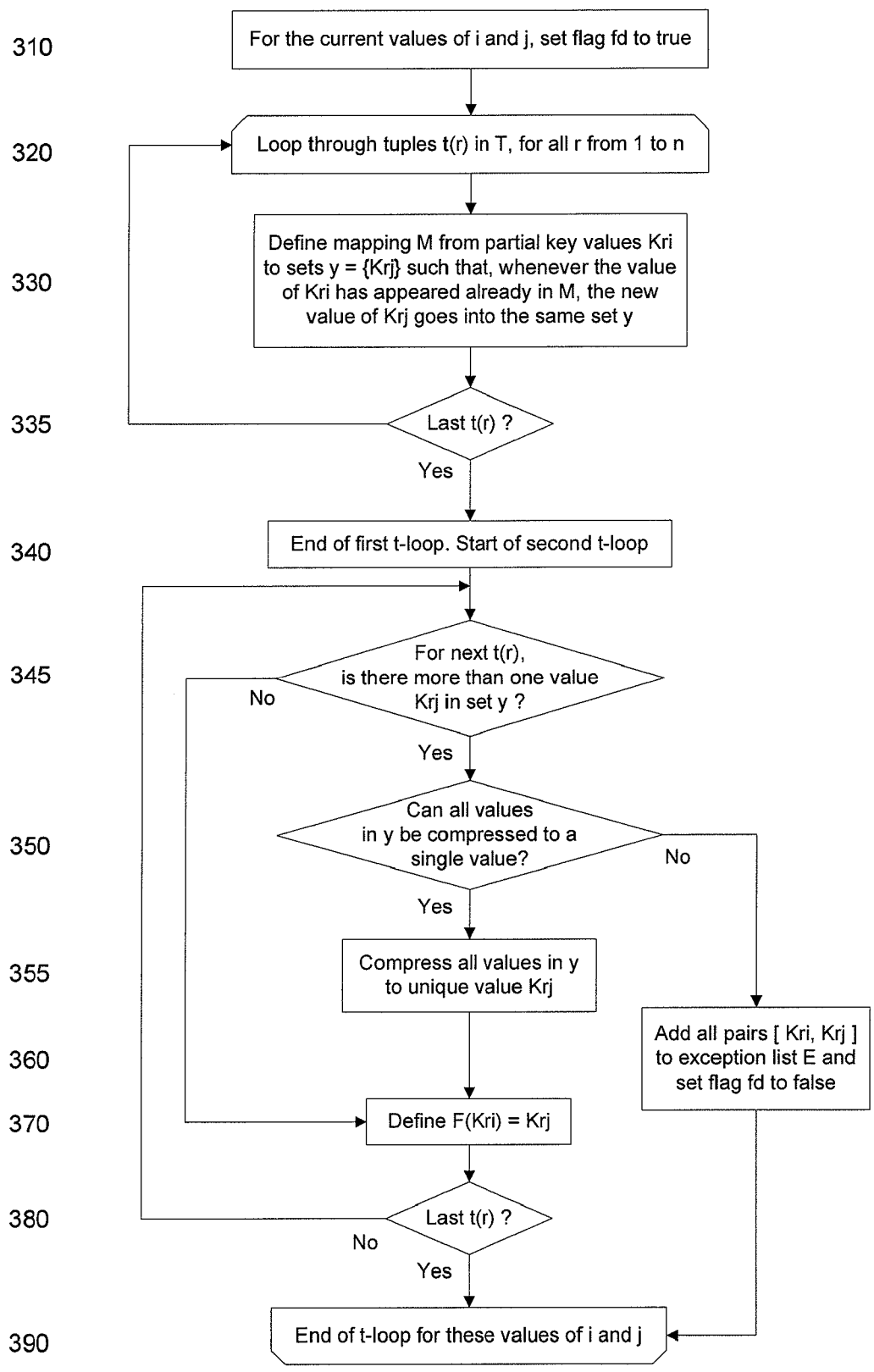
Figure 4:
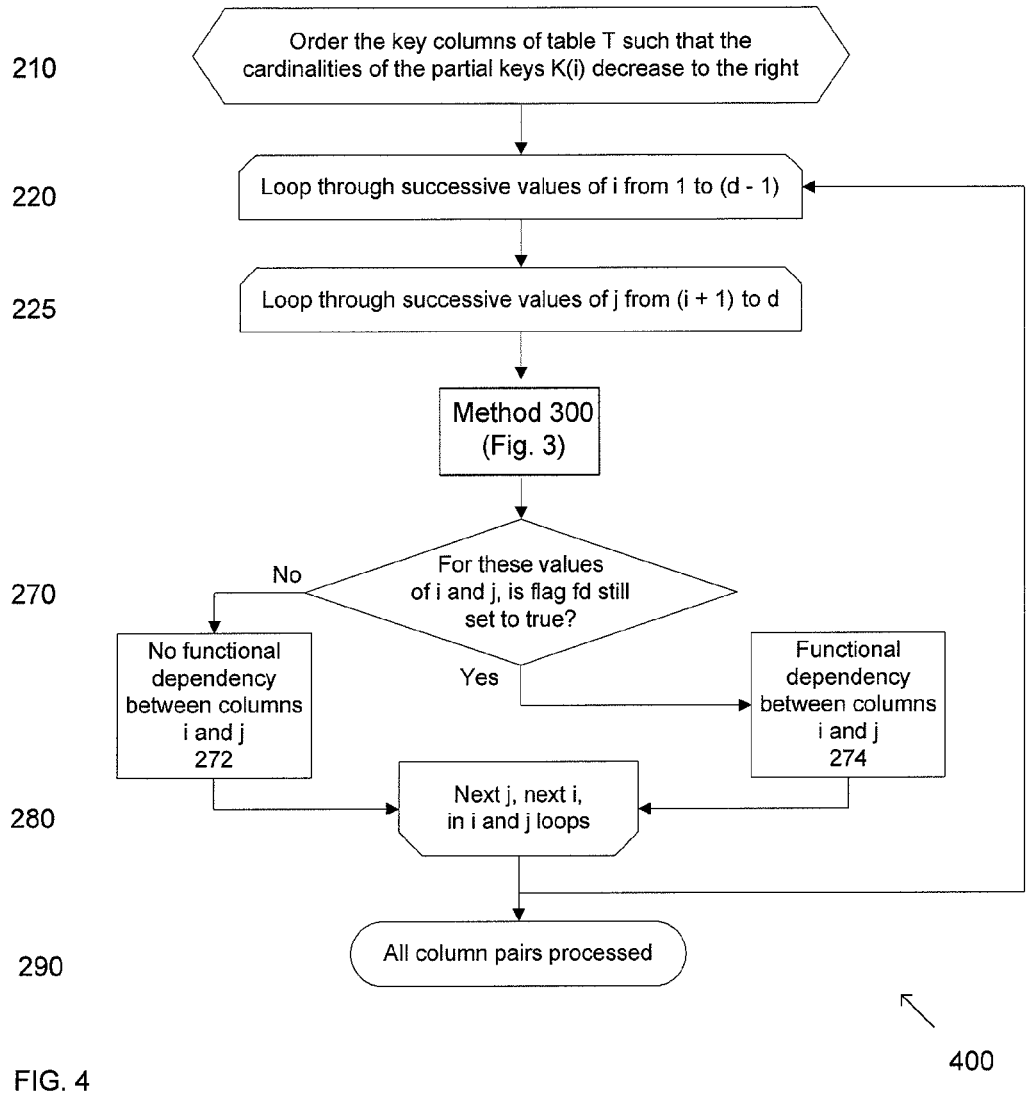

FIG. 1 illustrates a table in a business database.
FIG. 2 shows a first method to reduce redundant data.
FIG. 3 is a flow diagram for part of a second method.
FIG. 4 is a flow diagram combining the methods of FIGS. 2-3.

Like reference symbols in the various drawings may indicate like elements.

DETAILED DESCRIPTION

The present disclosure describes systems, methods, and techniques in which a business can reduce the redundancy of stored data. The data may be stored in tables in a relational schema and may be in memory, a database, or in other machine-readable mediums. The relational schema may include a cube-like data model. In one method, the redundant data may be data that a user can eliminate by means of normalization. In an alternative method, the redundant data may be data for which an approach to normalization fails due to a number of false entries in the data set and/or outliers (e.g., data which is far removed in value from others in a data set). In the second method, similarity-based or data cleansing functionality can be used to generate an exception list that can be of assistance in reducing the amount of redundant data. The data reduction methods, such as a method for reducing data redundancy by reorganizing the data, may reduce the resources required to handle and store the data, and may reduce the data-related operating and storage costs of a business.

FIG. 1 shows a schematic example 100 of a table T that may be used in a business database. The table has several rows (170-190) and several columns (110-160). Columns 110-140 may contain key attributes and columns 150-160 may contain non-key attributes. Key attributes (or partial keys) form keys that identify rows, whereas non-key attributes (or key figures) supply information. For example, the partial key K11 in the table (column 110, row 170) can represent a name of an employee (e.g., "Juan Smith"). The partial key K1$d$ (column 130, row 170) can represent a location of the employee (e.g., "Highpoint, N.C."). In column 150, row 170, the key figure N11 can represent a record the monetary value of the office supplies consumed by that employee (e.g., "$2,348.93"). In column 160, row 170, the key figure N1$k$ can represent a record a running average of the hours worked by that employee per week (e.g., "35 hours").

In FIG. 1, an exemplary schematic table T shows n tuples (also called rows) and (d+k) columns. The tuple t(r) on row r 180 of the table includes d key attributes or partial keys Kr1, . . . , Krd and k non-key attributes or key figures Nr1, . . . , Nrk. The first tuple t(1) is the first row 170 [K11, . . . , K1$d$, N11, . . . , N1$k$]. The n-th tuple t(n) is the last row 190 [Kn1, . . . , Knk, Nn1, . . . , Nnk]. Values Kri (for i ranging from 1 to d) may be character strings or various kinds of numbers, but in general, they can have a binary representation as bit strings. For the first tuple in the table, the key is the string obtained by concatenating the respective values K11, . . . , K1$d$ (where the dots represent the partial keys between the first partial key K11 and the last partial key K1$d$). If d=1, the first column contains a unique key attribute and there are no partial keys.

A difference between a partial key (a key attribute) and a key figure (a non-key attribute) is that a partial key helps to determine the identity of the record specified in its row. If a key is changed, a different record is specified. In general, a difference between key figures and non-key attributes is that key figures may be aggregated (e.g., to form sums or averages), whereas non-key attributes may not be aggregated in some cases. For example, some non-key attributes may be specified by text strings for which aggregation is undefined.

The table in FIG. 1 can be normalized or put into a normal form. Three or more kinds of normal form can be recognized. For example, a table is in a first normal form, 1NF, if and only if each cell contains a unique value (which may be empty, or zero, which is also a unique value), and not, for example, a pair or more of values. A table is in a second normal form, 2NF, if and only if it is in 1NF, and any non-key attribute is functionally dependent on the entire key—that is, for any key value, there is exactly one non-key attribute value, and that value depends on each partial key (e.g., that value is not independent of any of the partial keys). A table is in a third normal form, 3NF, if and only if it is in 2NF and there are no functional dependencies between any non-key attributes in the table—that is, if and only if it is in 2NF and the only functional dependencies in the table are from key values to non-key values.

FIG. 2 shows a method 200 to reduce redundant data in tables. The method 200 eliminates redundancies in tables that are not normalized. One or more terms can be defined for method 200, including the following terms: tuple t, which includes d partial keys K(1), . . . , K(d) and k key figures; table T, which includes n tuples (also called rows) and (d+k) columns; function F(x)=y is a mapping between partial keys x and y in the same tuple; and flag fd is a Boolean variable with a value of "true" or "false".

The method 200 can be executed as illustrated in FIG. 2. For each partial key K(i), determine how many distinct values of K(i) appear in the n rows of table T (block 210). The number of distinct values of K(i) is called its cardinality. Then, reorder the key columns of table T by cardinality (block 210), so that the column with highest cardinality appears in the leftmost position and the column with lowest cardinality appears in the rightmost position.

The next step in the method 200 is to check for functional dependencies between each pair of partial keys. For each partial key K(i) in turn (block 220), and each further partial key K(j) to its right (block 225) in the reordered table T, set flag fd to "true" (block 230) and work in turn through all the n tuples t(r), for r running from 1 to n, in the table T (block 240). In order words, loop through successive values of i from 1 to (d−1) (block 220), and loop through successive values of j from (i+1) to d (block 225). Then set the flag fd to "true" for current values of i and j (block 230), and loop through all n tuples t(r) in table T (block 240).

The next step in method 200 is to define a function F from partial key K(i) to partial key K(j) for the successive rows t of table T. For each row t(r), determine whether the function F has already been defined for the value Kri of partial key F(i) appearing in row r (block 250). If the function has not yet been defined then set the function F(Kri) to Krj, where Krj is the value of partial key K(j) appearing in row r (block 252). In cases where a value Kri of K(i) has already been assigned to different value Krj of K(j) in an earlier row (that is, for a smaller value of r), a function F cannot be defined (block 255). F may not be defined because by definition, F(x)=y is a function only if for any given x, the value of y is unique. In such cases where F cannot be defined, the flag fd is set to "false" (block 257) and the loop through tuples t(r) is broken off (e.g., the end of the t-loop for these values of i and j) (block 265). In cases where a value Kri of K(i) has already been assigned to the same value Krj of K(j) in an earlier row (that is, for a smaller value of r) (block 260), the function F is confirmed and the algorithm continues the loop to the next tuple t(r) (block 240). If the function F is confirmed for all rows t (block 270), the flag fd is still set to "true" and there is a functional dependency between the two columns (block 274). Otherwise, there is not a functional dependency between columns i and j (block 272). This process repeats for each pair of columns i and j (block 280) until the entire table T is processed (block 290).

Any column that the method 200 reports as functionally dependent on another column can be eliminated from the table and reconstituted later dynamically, as required, by means of the application of the relevant function F defined in the method 200.

FIG. 3 is a variation of the flow diagram of FIG. 2. In general, steps 230-265 of FIG. 2 (block 295) can be replaced by steps 310-390 in FIG. 3. In FIG. 3, the replacement steps 310-390 are a different treatment of the mappings F. The combination of the steps 210-225, 310-390 (block 300), followed by steps 270-280 can be considered a generalization of the method 200 of FIG. 2, and are shown in FIG. 4. For example, the method 400 in FIG. 4 can be adapted to create a function F plus an exceptions list, and/or the method 400 can be adapted to detect outliers and/or false entries in the data set.

The method 400 can be executed as follows: for each partial key K(i), determine how many distinct values of K(i) appear in the n rows of table T (block 210). The number of distinct values of K(i) is called its cardinality |K(i)|. Then, reorder the key columns of table T by cardinality, so that the column with highest cardinality appears first (e.g., in the leftmost position), and the column with the lowest cardinality appears last (e.g., in the rightmost position) (block 210). Next, check for functional dependencies between each pair of partial keys K(i) and K(j), for i from 1 to (d−1) and for j from (i+1) to d (blocks 220, 225). At this point, the method is the same as method 200. After step 225, the method is the same as method 300 of FIG. 3.

In method 300 of FIG. 3, the flag fd is set to "true" for current values of i and j (block 310). To find a functional dependency between partial keys K(i) and K(j), a loop is executed through tuples t(r) in table T, for all r from 1 to n (block 320). At each step, a mapping M is defined from partial key value Kri to partial key value Krj (block 330). If there is no functional dependency between key values K(i) and K(j), some partial key values Kri are repeated for different values of r but map to different values Krj for the respective values of r. In such cases, the different values of Krj are collected in sets y={Krj} corresponding to the repeated values of Kri (block 330). When all such sets y have been determined by completing the first t-loop (blocks 320 to 335), the first t-loop terminates and a second troop begins (block 340).

In the second t-loop (blocks 340 to 390), the partial key values Krj in respective sets y={Krj} for successive tuples t(r) are checked (block 345). If the sets y contain more than one value, the method checks whether the values in the set are sufficiently similar to enable them to be compressed into a single value (block 350). If they can be so compressed, the method compresses them to a unique value Krj (block 355) and sets the value of function F(Kri)=Krj (block 370). If they cannot be so compressed, all the incompressible pairs [Kri, Krj] are added to an exceptions list E (block 360). The flag fd for these values of i and j was initialized to "true" at step 310, but fd is set to "false" in case any pairs are added to the exceptions list E (block 360). This process for the second t-loop (blocks 340 to 390) continues until all tuples t(r) have been checked (blocks 380, 390). At step 390, the processing in method 300 is completed for these values of i and j, and the method continues with step 270 in method 400, as shown in FIG. 4.

Similarity of entries can be defined by using either a standard or a customized similarity measure, such as a similarity function or a data cleansing function. For example, if two keys map to a table of customers, the table may contain two rows for the same customer—one written as "Mueller" and the other as "Müller"—that are either recognized as similar to each other by the fact that every other attribute in the two rows is identical, and the data may be cleansed manually by deleting one of the two rows. The deletion of redundant rows can have two effects. For one, the deletion can directly reduce the redundancy in the data rows. Secondly, the deletion can indirectly reduce redundancy by enabling redundant columns to be identified and deleted.

The exception list E can be considered as exceptions to the mapping from the values Kri of partial key K(i) to values Krj of partial key K(j) for cases when the values of K(i) do not map uniquely to values of K(j). The exception list E may be produced once suitable similarity measures and compression procedures (blocks 350, 355) have been implemented. The exceptions include the cases that prevent a function F from being defined from partial key K(i) to partial key K(j). Given the exception list E, a function F for these partial keys can be defined with the proviso that function F is applicable only for those rows r that do not index entries in the exception list E.

In another implementation, one or more queries and one or more answers to those queries may be associated with the data in the table. An alternative method may check the exception list E to answer a query before accessing function F. The method may be able to answer the query by searching through the exception list E. If no entry exists for the current row in that list, the method can answer the query by using the functional dependency defined by F to find corresponding values in the table.

The exception list can be particularly useful in cases where the number of exceptions is low. If data cleansing cannot eliminate exceptional tuples, it may be likely that columns i and j cannot be compressed to a single column. Data cleansing can refer the process of examining irregular entries in a table and either correcting or deleting them. For example, if a table column lists the cities of residence of customers of an online clothing store and includes an entry for "New York" then a data cleansing function may either automatically correct the entry to "New York" or flag the entry for manual examination and correction.

In general, the methods 200 and 400 can both be executed recursively on dependent tables. Any columns that are reported as dependent can either be eliminated automatically or displayed to the user for interactive individual treatment. Once the first and second methods have been used to eliminate redundancies from a table and the data is manually cleansed to remove any false entries reported as exceptions by the second method, the table can be stored in less space in memory or in the database. The methods 200 and 400 are applicable to any data stored in tables in a relational database model such as a cube-like data model As used herein, the terms "electronic document" and "document" mean a set of electronic data, including both electronic data stored in a file and electronic data received over a network. An electronic document does not necessarily, but may, correspond to a file. A document may be stored in a portion of a file that holds other documents, in a single file dedicated to the document in question, or in a set of coordinated files. The term "object" may refer to information sources such as documents, reports, presentations, files and directories.

Various implementations of the systems and techniques described here can be realized in digital electronic circuitry, integrated circuitry, application specific integrated circuits (ASICs), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

The software (also known as programs, software tools or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, random access memory (RAM), programmable logic devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface, portal, or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), a wireless local area network (WLAN), a personal area network (PAN), a mobile communication network using a multiple access technology (e.g., a cellular phone network with code division multiple access, CDMA), and the Internet.

The computing system can include clients and servers. A client and server are generally remote from each other and typically interact through a communication network. The relationship of client and server arises by virtue of computer programs running on the respective computers and having a client-server relationship to each other.

Although only a few implementations have been described in detail above, other modifications are possible. Nevertheless, it will be understood that various modifications may be made without departing from the spirit and scope of the claims below. For example, the logic flow depicted in FIGS. 2-4 do not require the particular order shown, or sequential order, to achieve desirable results. Accordingly, other implementations are within the scope of the following claims.

What is claimed is:

1. A computer-implemented method comprising:
reducing redundancy within a data model in a database, wherein the data model is represented by a table comprising a plurality of rows, wherein each row includes a plurality of partial keys and a plurality of key figures representing first data records, the plurality of partial keys identifying locations of second data records, the reducing comprising:
determining a number of distinct values of partial keys in the table;
reordering one or more columns of the table by cardinality of partial keys, wherein the cardinality of a partial key represents a number of distinct values of the partial key;
determining whether pairs of partial keys are functionally dependent by defining a function from each partial key to every other partial key of the reordered table; and eliminating, based on the defined function, one or more columns having functional dependencies from the table to reduce the redundancy within the data model.

2. The method in accordance with claim 1, further comprising:
placing the one or more eliminated columns into a separate table so that the column with a highest cardinality is in the leftmost position, and the column with the lowest cardinality is in the rightmost position.

3. The method in accordance with claim 2, wherein partial key K(i) comprises a partial key with an index i and a value Kri for a tuple t(r) in row with index r, and wherein the number of distinct values of K(i) comprises cardinality |K(i)|.

4. The method in accordance with claim 3, wherein the tuple t comprises k key figures and d partial keys K(1), . . . , K(d).

5. The method in accordance with claim 4, wherein a table T comprises n tuples and d+k columns, wherein the n tuples comprise rows.

6. The method in accordance with claim 5, wherein a function $F(x)=y$ comprises a mapping between partial keys x and y in a same tuple.

7. The method in accordance with claim 6, wherein a flag fd comprises Boolean values of true or false.

8. The method in accordance with claim 7, wherein determining whether pairs of partial keys are functionally dependent further comprises:
defining function F from each partial key to every other partial key to its right in a reordered table for each row in table T; and
determining a functional dependency exists when the function $F(Kri)=Krj$ is the same function for each tuple t(r) in the table for values of index i from 1 to (d−1) and for values of j from (i+1) to d.

9. The method in accordance with claim 8, wherein when a tuple t is in the table T and F(Kri) is not equal to Krj, a functional dependency does not exist between columns i and j.

10. The method in accordance with claim 9, wherein determining whether pairs of partial keys are functionally dependent for each i from 1 to (d−1) and j from (i+1) to d comprises:
setting the flag fd to true;
for each tuple t in T, determining whether F(Kri) is defined, wherein F(Kri) is set equal to Krj upon determining that F(Kri) is not defined;
looping through the tuples t in T; and
generating a report indicating that column i is functionally dependent on column j if flag fd is true after the looping through the tuples t in T.

11. The method in accordance with claim 10, wherein determining whether F(Kri) is defined comprises:
upon determining that F(Kri) is defined, determining whether F(Kri) is equal to Krj, wherein determining that F(Kri) is equal to Krj permits looping through the tuples t in T, and wherein determining that F(Kri) is not equal to Krj comprises:
concluding that K(i) is not functionally dependent on K(j);
setting flag fd to false; and
breaking the looping through the tuples t in T.

12. A computer-implemented method comprising:
reducing redundancy within a data model in a database, wherein the data model is represented by a table comprising a plurality of rows, wherein each row includes a plurality of partial keys and a plurality of key figures representing first data records, the plurality of partial keys identifying locations of second data records, the reducing comprising:
determining a number of distinct values of partial keys in the table;
reordering one or more columns of the table by cardinality of partial keys, wherein the cardinality of a partial key represents a number of distinct values of the partial key;
determining whether pairs of partial keys are functionally dependent by defining a function from each partial key to every other partial key of the reordered table;
eliminating, based on the defined function, one or more columns having functional dependencies from the table to reduce the redundancy within the data model; and
creating an exception list for the pairs of partial keys that are not functionally dependent.

13. The method in accordance with claim 12, wherein partial key K(i) comprises a partial key with an index i for a tuple t, wherein the number of distinct values of K(i) comprises cardinality |K(i)|, wherein the tuple t comprises k key figures and d partial keys K(i) for i from 1 to d, wherein a table T comprises n tuples and (d+k) columns, wherein the n tuples comprise rows, and wherein a function $F(x)=y$ comprises a mapping between partial keys x and y in a same tuple.

14. The method in accordance with claim 12, wherein the exception list for the pairs of partial keys that are not functionally dependent comprises partial keys pairs that do no fit a functional dependency defined for other tuples in the table, and wherein the exception list represents errors in the one or more data models.

15. The method in accordance with claim 14, wherein the determining whether pairs of partial keys are functionally dependent comprises:
defining function F from each partial key to every other partial key to its right in a reordered table for each row in table T; and
determining a functional dependency exists for i from 1 to (d−1) and j from (i+1) to d, wherein the function $F(Kri)=Krj$ is the same function for each tuple t(r) in the table.

16. The method in accordance with claim 15 wherein when for i from 1 to (d−1) and j from (i+1) to d the function $F(Kri)=Krj$ is not the same function for each tuple t(r) in the table, there exists one or more mappings from Kri to Krj for different values of r, wherein different values of r are related to different tuples t(r), and upon determining multiple mappings, checking whether one or more entries in set {Krj} are similar for each t(r).

17. The method in accordance with claim 16, wherein a similarity is defined with any one of a similarity function and a data cleansing function.

18. The method in accordance with claim 17, wherein if a subset of {Krj} is similar, compress the subset to a single value x to compress multiple mappings to a single functional dependency, wherein if a subset of {Krj} is not similar, create an exception list for non-similarities, and wherein the creating an exception list for non-similarities comprises mapping a row number r for tuple t(r) of each dissimilar entry Krj to a corresponding value Kri.

19. The method in accordance with claim 18, further comprising rewriting one or more queries against the table to check the exception list before accessing function F, wherein if no entry exists for the current row in that list, use the functional dependency defined by F.

20. An article comprising a machine-readable medium storing instructions operable to cause a machine to perform operations comprising:

reducing redundancy within a data model in a database, wherein the data model is represented a table, comprising a plurality of rows, wherein each row includes a plurality of partial keys and a plurality of key figures representing first data records, the plurality of partial keys identifying locations of second data records, the reducing comprising:

determining a number of distinct values of partial keys in the table;

reordering one or more columns of the table by cardinality of partial keys, wherein the cardinality of a partial key represents a number of distinct values of the partial key;

determining whether pairs of partial keys are functionally dependent by defining a function from each partial key to every other partial key of the reordered table; and eliminating, based on the defined function, one or more columns having functional dependencies from the table to reduce the redundancy within the data model.

\* \* \* \* \*